Feb. 17, 1931.  W. L. GILMORE  1,792,489
JOINT FITTING
Filed Jan. 17, 1925
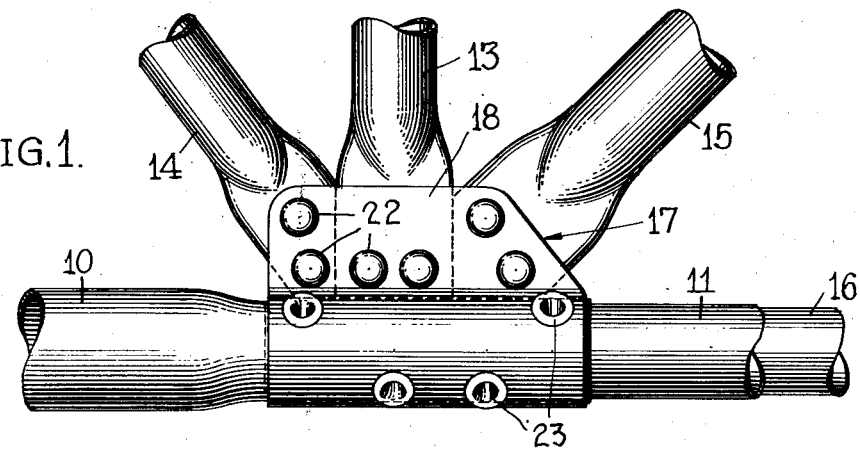
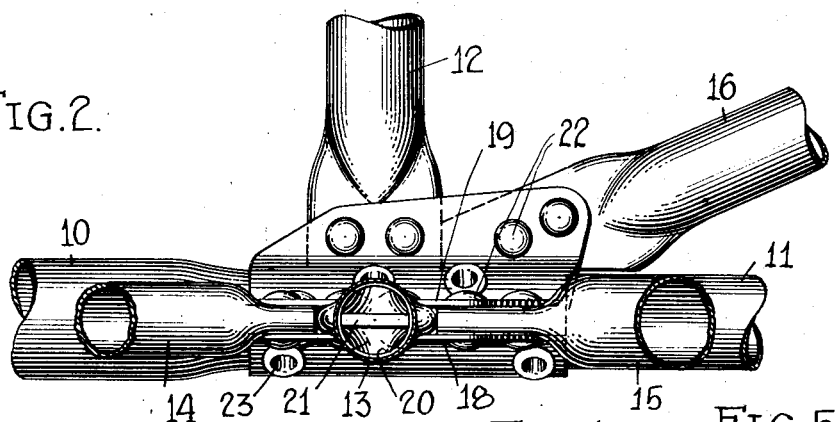
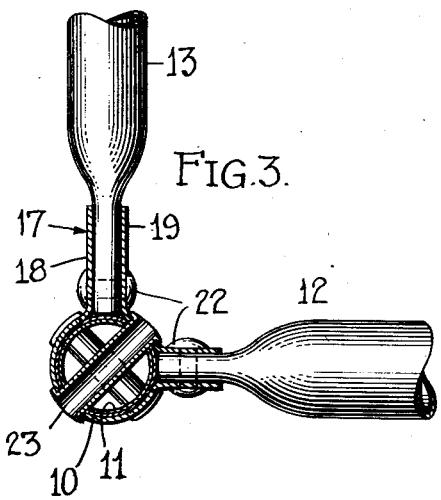
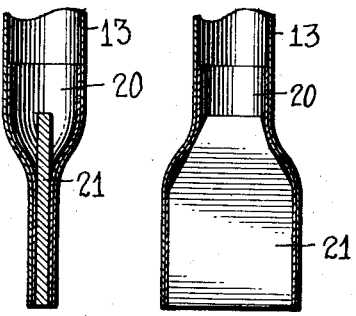
INVENTOR
WILLIAM L. GILMORE.
BY
ATTORNEY Patented Feb. 17, 1931

1,792,489

UNITED STATES PATENT OFFICE

WILLIAM L. GILMORE, OF MINEOLA, NEW YORK, ASSIGNOR TO CURTISS AEROPLANE AND MOTOR CO., INC., A CORPORATION OF NEW YORK

JOINT FITTING

Application filed January 17, 1925. Serial No. 3,070.

My invention relates to joint fittings for framed structures and is more particularly concerned with aeroplane structures having incorporated therein one or more non-weldable metallic frame members required to be fastened together or rigidly joined.

In the construction of a metal aeroplane framed structure such as an aeroplane fuselage or wing, it is absolutely essential that fixed end connections be provided and that the fuselage or wing be absolutely rigid and the frame members perfectly aligned and fitted throughout. Where steel tubing is employed in the construction of the frame the desired fixed end connections may be readily obtained by providing welded joints. Due to the expansion and contraction, however, of the metal, in effecting the necessary welded joints, the frame members not infrequently assume an out of alignment position; such a condition necessitating a re-alignment of the framed structure in its final assembly and after all welded joints have been made. Notwithstanding this drawback occasioned thru the use of steel, steel tubing has been quite extensively employed heretofore. Steel tubing is amply strong and perfectly adapted to the formation of welded joints.

Other known metals, duralumin for instance, having a tensile strength approximately equal that of steel, and very much lighter, would certainly have been used heretofore were it not for the fact that such metals are incapable of being welded. The strength and lightness of duralumin as compared to steel makes it an extremely desirable metal for use in aeroplane structures where provision is made for fixed end connections and rigid joints throughout the structural frame. The object of the invention is to attain these ends without a sacrifice in strength and with a decided gain in weight considerations. Instead of welding the frame members at the various joints, the frame members, at said joints, are strongly reinforced and rigidly joined by riveting; a flat plate fitting being preferably employed for this purpose. Thus organized, perfect alignment of the frame is insured when the frame is completed without the necessity of effecting a re-alignment, which, together with the fact that the completed frame is considerably lighter and equally as strong, makes it a most desirable aeroplane adjunct.

In the drawings, wherein like reference characters denote like or corresponding parts, Fig. 1 is a side elevation of a portion of an aeroplane fuselage showing the manner in which the frame members thereof are joined;

Fig. 2 is a view in section illustrating from a different angle the joint of Fig. 1;

Fig. 3 is a transverse section of the joint of Fig. 1, and

Figs. 4 and 5 are sectional views, taken at right angles, showing the end formation of the transverse frame members comprised in the structural frame.

In the embodiment of the invention selected for illustration, all parts of the framed structure, as well as the fixed end connections or joints, are constructed of an aluminum alloy metal such as duralumin. Said framed structure includes aligned longitudinal frame members 10 and 11 rigidly fastened by telescoping one of said frame members within the other; such an arrangement lending stiffness at the joint and providing at said joint several thicknesses of metal.

In addition to the longitudinal frame members 10 and 11 the framed structure comprises transverse frame members 12 and 13, the former being horizontal and the latter vertical and both rigidly fastened to the longitudinal frame members at the telescopic joint. There are, in addition to the frame members 12 and 13, certain diagonal frame members 14, 15 and 16, the latter frame members forming with the frame members 10, 11, 12 and 13 a skeleton frame work or truss. The transverse and diagonal frame members at their ends abut the longitudinal frame member where they are rigidly fastened by means of a flat plate attachment fitting 17 comprising, in the present embodiment, an inner and an outer part. The outer part, designated as 18, is bent around the longitudinal frame member (10—11) and at its opposite ends is extended off therefrom in the direction of the major axis of the transverse and diagonal frame members to which it is joined. The inner fitting part 19 is likewise extended along the major axis of the mentioned frame parts to form with the part 18 suitable pockets or recesses within which the ends of the transverse and diagonal frame members are disposed.

As the modulus of elasticity of duralumin is but one-third that of steel, each of the transverse frame members as well as the diagonal frame members, at the ends, is doubly reinforced, first by fitting on the inside of the end a reinforcing tube 20 and secondly by providing on the inside of the reinforcing tube a flat plate member 21; both said reinforcement members being held in place thru their snug engagement. The ends of the transverse and diagonal frame members, in addition to being internally reinforced, are flattened lengthwise of the longitudinal frame member whereby relatively large bearing surfaces are provided against which the fitting parts 18 and 19 are held. Thus organized, all stresses to which the frame members are subjected are directly carried to the neutral axes of the respective frame parts.

Instead of welding the transverse and diagonal frame members to the longitudinal frame members comprised in the framed structure, the said members are riveted in place, solid rivets 22 being provided to fasten the transverse and diagonal frame members to the fitting parts and hollow rivets 23 being provided to fasten the fitting parts to the longitudinal frame members of the skeleton frame. In using solid rivets as indicated, the longitudinal frame members are relieved of all compression loads and the rivets themselves made to carry the shear load of the truss. By using hollow rivets as indicated, the projected area of the rivets is ample and the riveting process simplified to a considerable degree. Moreover, the rivets in each instance are carried entirely thru the many thicknesses of metal provided at the joint.

Joint fittings characterized as above set forth have the following advantages over the welded fittings heretofore used. Such fittings are lighter than any fittings heretofore proposed. Deflection is avoided thru the overlapping or telescopic joint provided for the sections comprising the longitudinal frame member of the frame. Stiffness at the joint is obtained and all tendency to weave is avoided thru the reinforcement of the transverse and diagonal frame member ends. All deformation, due to expansion and contraction due to the heat required in welding is eliminated and a positive lining up of the fuselage, when completed, insured. Moreover, where repair is necessary, no danger, such as is encountered in repairing a welded joint ensues; nor is it necessary to re-align the frame after the repair job is completed. Preferably, duralumin tubing is used throughout.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In an aeroplane frame structure, a longitudinal frame member, a tubular transverse frame member flattened at one end, in the direction of the major axis of said longitudinal frame member, a sheet metal attachment fitting wrapped around said longitudinal frame member and having formed thereon spaced ears between which the flattened end of said transverse frame member is adapted to engage, hollow rivets passing twice thru said attachment fitting and entirely thru said longitudinal frame member for fastening said fitting to said longitudinal frame member, and rivets passing thru both said ears and thru said flattened end of said transverse frame member for fastening said transverse frame member in place.

2. In an aeroplane frame structure, aligned tubular frame members telescopically engaging one within the other at the joint therebetween, a tubular transverse frame member having a flattened end bearing on said joint and extending off therefrom from an angle, a sheet metal fitting for the attachment of said transverse frame member wrapped around said aligned frame members at said joint, said fitting being shaped to provide spaced ears between which the flattened end of said transverse frame member is adapted to engage, and rivet connections respectively between said ears and the flattened end of said transverse frame member and said fitting and the several thicknesses of metal at said joint.

3. In an aeroplane frame structure, a longitudinal frame member, a tubular transverse frame member flattened at one end and bearing at its flattened end on said longitudinal frame member, a sheet metal attachment fitting wrapped around and riveted to said longitudinal frame member, ears formed upon said fitting to extend off from said longitudinal frame member, one each on opposite sides of the flattened end of said transverse frame member, means engaging within the hollow of said transverse frame member to reinforce its flattened end, and rivets passing thru both said ears and the reinforced end of said transverse frame member to fasten said transverse frame member in place.

4. In an aeroplane frame structure, an aluminum alloy longitudinal frame member, an aluminum alloy transverse frame member, each said frame member being tubular, and said transverse frame member being internally reinforced and flattened at one end in the direction of the major axis of said longitudinal frame member, a sheet metal attachment fitting wrapped around said longitudinal frame member and having formed thereon spaced ears between which the flattened reinforced end of said transverse frame member is adapted to engage, rivets passing twice thru said longitudinal frame member and said attachment fitting for fastening said attachment fitting to said longitudinal frame member, and rivets passing thru both said ears and thru the flattened reinforced end of said transverse frame member for fastening said transverse frame member to said attachment fitting.

5. In an aeroplane frame structure, a tubular aluminum alloy longitudinal frame member, a tubular aluminum alloy transverse frame member, a sheet metal attachment fitting wrapped around said longitudinal frame member and having formed thereon spaced ears between which one end of said transverse frame member is adapted to engage, said attachment fitting being separately riveted directly to said transverse frame member and to said longitudinal frame member, and said rivets in one instance being hollow rivets which span the inside diameter of the particular frame member thru which said rivets pass.

6. In an aeroplane frame structure, aligned tubular aluminum alloy longitudinal frame members telescopically engaging one within the other at the joint therebetween, a transverse tubular aluminum alloy frame member having a flattened end bearing on said joint and extending off therefrom at an angle, a sheet metal fitting for the attachment of said transverse frame member wrapped around said aligned longitudinal frame members at said joint, said fitting being shaped to provide spaced ears between which the flattened end of said transverse frame member is adapted to engage, means engaging within the hollow of said transverse frame member to reinforce its flattened end, hollow rivets passing twice thru said attachment fitting and thru the several thicknesses of metal at said joint for fastening said attachment fitting to said longitudinal frame member, and rivets passing thru both said ears, and thru the flattened reinforced end of said transverse frame member for fastening said transverse frame member to said attachment fitting.

In testimony whereof I hereunto affix my signature.

WILLIAM L. GILMORE.